Jan. 25, 1944.  W. H. RICHARDS  2,339,810
CAMERA
Filed Nov. 22, 1939  8 Sheets-Sheet 1

INVENTOR
WILLIAM H. RICHARDS

Jan. 25, 1944. W. H. RICHARDS 2,339,810
CAMERA
Filed Nov. 22, 1939 8 Sheets-Sheet 2

INVENTOR
WILLIAM H. RICHARDS

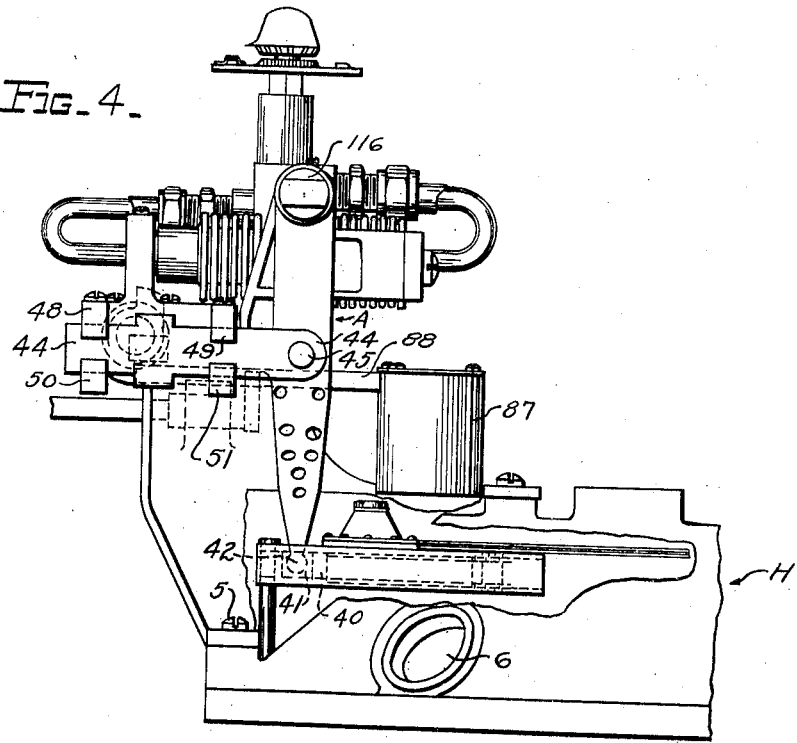

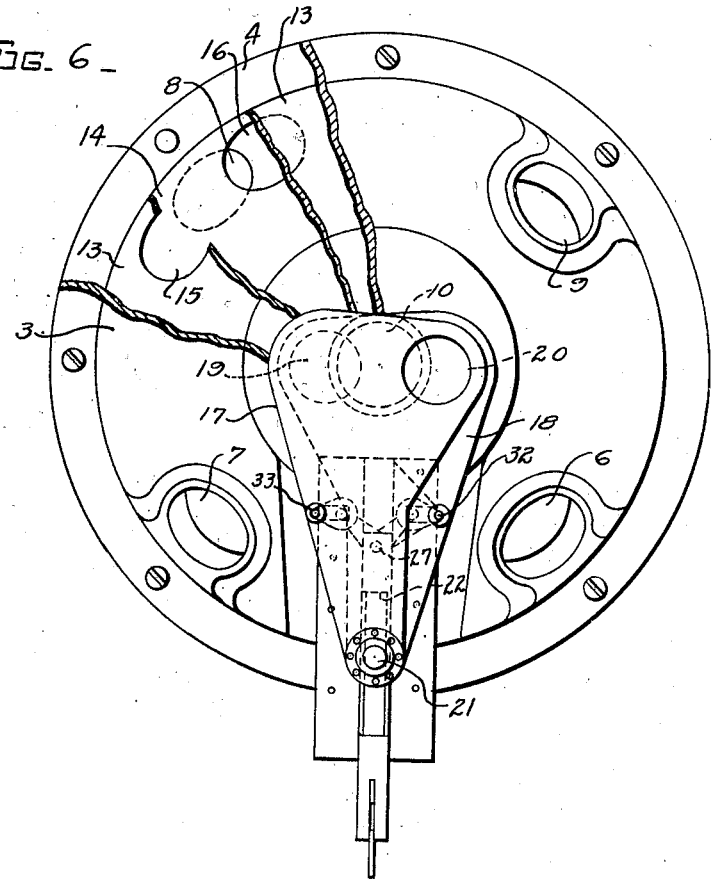

Jan. 25, 1944.   W. H. RICHARDS   2,339,810
CAMERA
Filed Nov. 22, 1939   8 Sheets-Sheet 5
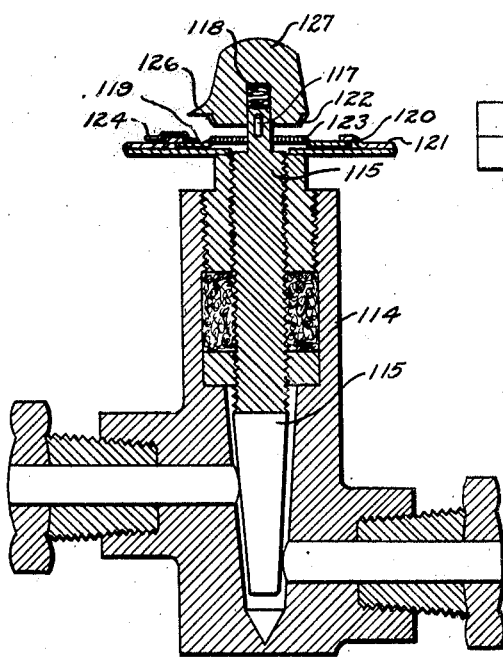
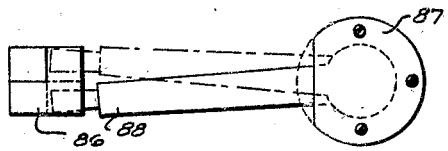
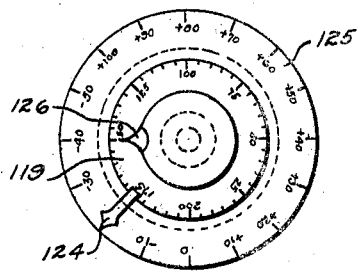
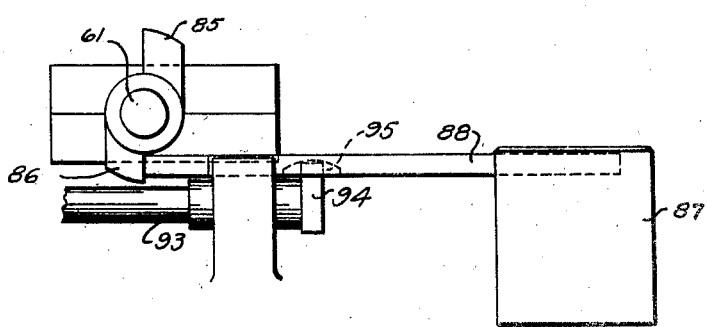
INVENTOR
WILLIAM H. RICHARDS
BY
ATTORNEYS Jan. 25, 1944.    W. H. RICHARDS    2,339,810
CAMERA
Filed Nov. 22, 1939    8 Sheets-Sheet 6
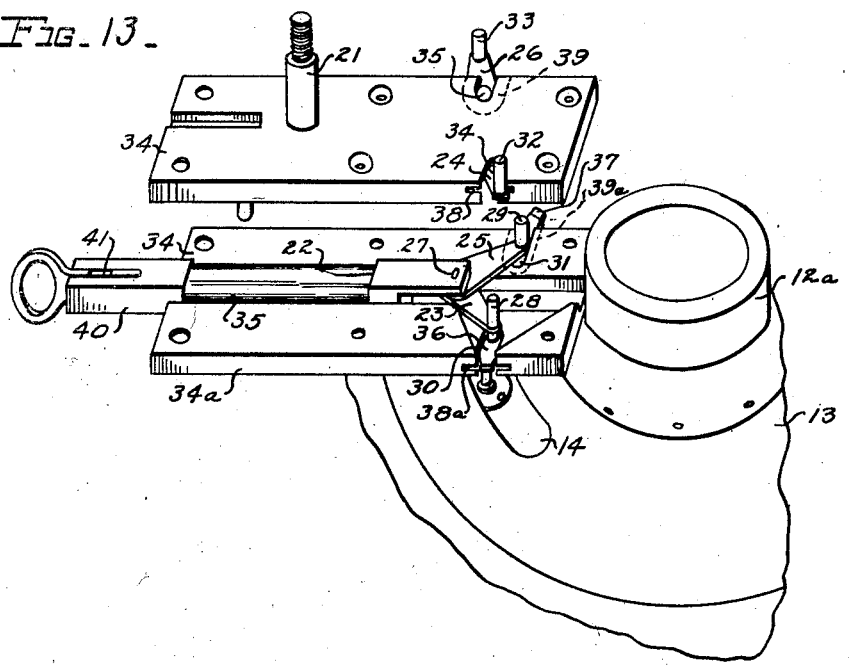
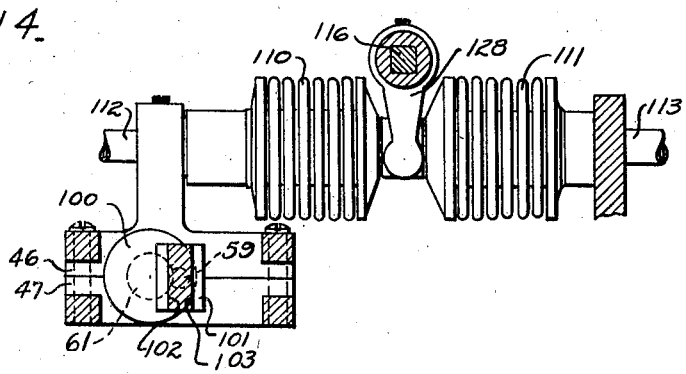
INVENTOR
WILLIAM H. RICHARDS
BY
ATTORNEYS

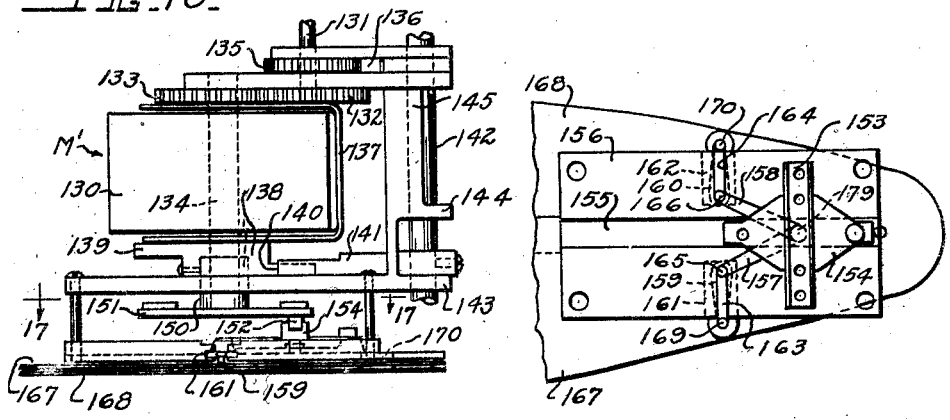
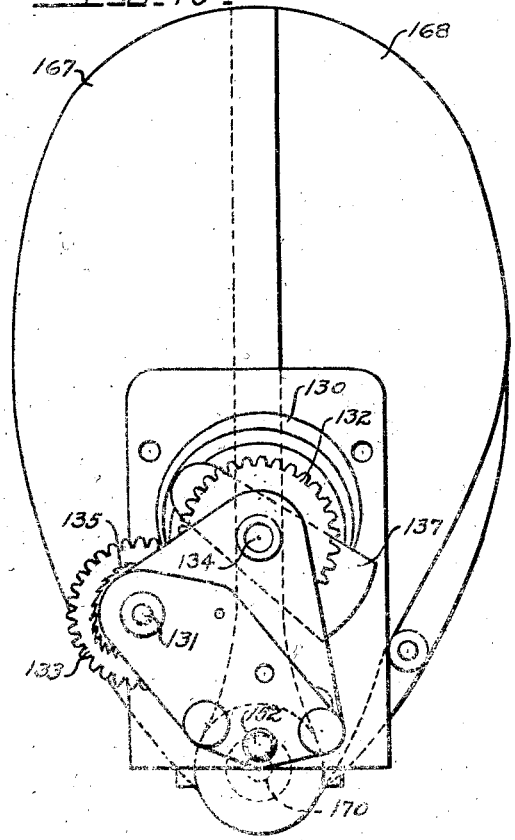

Jan. 25, 1944. W. H. RICHARDS 2,339,810
CAMERA
Filed Nov. 22, 1939  8 Sheets-Sheet 8

INVENTOR
WILLIAM H. RICHARDS

Patented Jan. 25, 1944

2,339,810

UNITED STATES PATENT OFFICE 2,339,810

CAMERA

William H. Richards, Dayton, Ohio

Application November 22, 1939, Serial No. 305,673

19 Claims. (Cl. 95—62)

(Granted under the act of March 3, 1883, as amended April 30, 1928; 370 O. G. 757)

The invention described herein may be manufactured and used by or for the Government for governmental purposes, without the payment to me of any royalty thereon.

This device relates to camera shutters and operating mechanism therefor.

It is an object of this invention to provide a shutter-operating mechanism which, when moved in each of two directions, will cause the shutter to pass through a complete opening and closing cycle.

It is also an object of this invention to provide a mechanism for simultaneously operating separate shutters associated with the several lenses of a multilens camera.

It is a further object of this invention to provide a shutter-operating mechanism which will operate smoothly and efficiently in either of two directions on the application, in the selected direction, of a predetermined force—the operating mechanism being so constructed and arranged that the forces for operating it in each direction are equal in magnitude.

It is still a further object of this invention to provide a new and novel spring motor for driving the shutter-operating mechanism; a new shutter release latch mechanism associated with the motor; and a mechanism geared to the film-winding mechanism for winding the spring motor after each exposure, so that the spring motor will exert on the shutter-operating mechanism the same driving force for each exposure.

It is still another object of this invention to provide viscosity means for regulating the shutter speed, the viscosity means being precalibrated in a cold chamber for a complete range of shutter speeds at temperatures that will be encountered.

It is another object of this invention to adapt a camera for night use by combining in a single unit, a lens shutter; shutter-operating mechanism; and a photoelectric cell adapted, upon energization by light—for instance, from a flare—to operate a relay for releasing a shutter-operating mechanism.

Other objects of the invention will become apparent from the following description:

In the drawings, Fig. 1 is an elevational view of a multilens camera partly broken away to show the shutter-operating mechanism;

Fig. 4 is an elevational view looking in the direction of the arrow 4—4 in Fig. 3;

Fig. 5 is a cross-sectional view through the shutter and lens housing taken generally along the lines 5—5 of Fig. 3;

Fig. 6 is a detailed plan view taken along the lines 6—6 of Fig. 5;

Fig. 7 is a plan view of the shutter and the link-operating mechanism therefor with the shutter in the open or exposed position;

Fig. 8 is a plan view similar to Fig. 7 showing the shutter-operating mechanism in closed position;

Fig. 9 is a detailed cross-sectional view taken along the lines 9—9 of Fig. 2;

Fig. 10 is a detailed plan view taken along the lines 10—10 of Fig. 2;

Fig. 11 is a detailed elevational view of the latch-operating mechanism taken along the lines 11—11 of Fig. 2;

Fig. 12 is a detailed top plan view of the latch-operating mechanism shown in Fig. 11;

Fig. 13 is a perspective view—with certain parts separated—of the linkage mechanism for operating the shutters;

Fig. 14 is a view taken along the lines 14—14 of Fig. 3;

Fig. 15 is a detail plan view of a single shutter and a spring motor for operating the same;

Fig. 16 is an elevational view looking from the left in Fig. 15;

Fig. 17 is a detailed plan view as seen along the lines 17—17 of Fig. 16;

Figure 1:
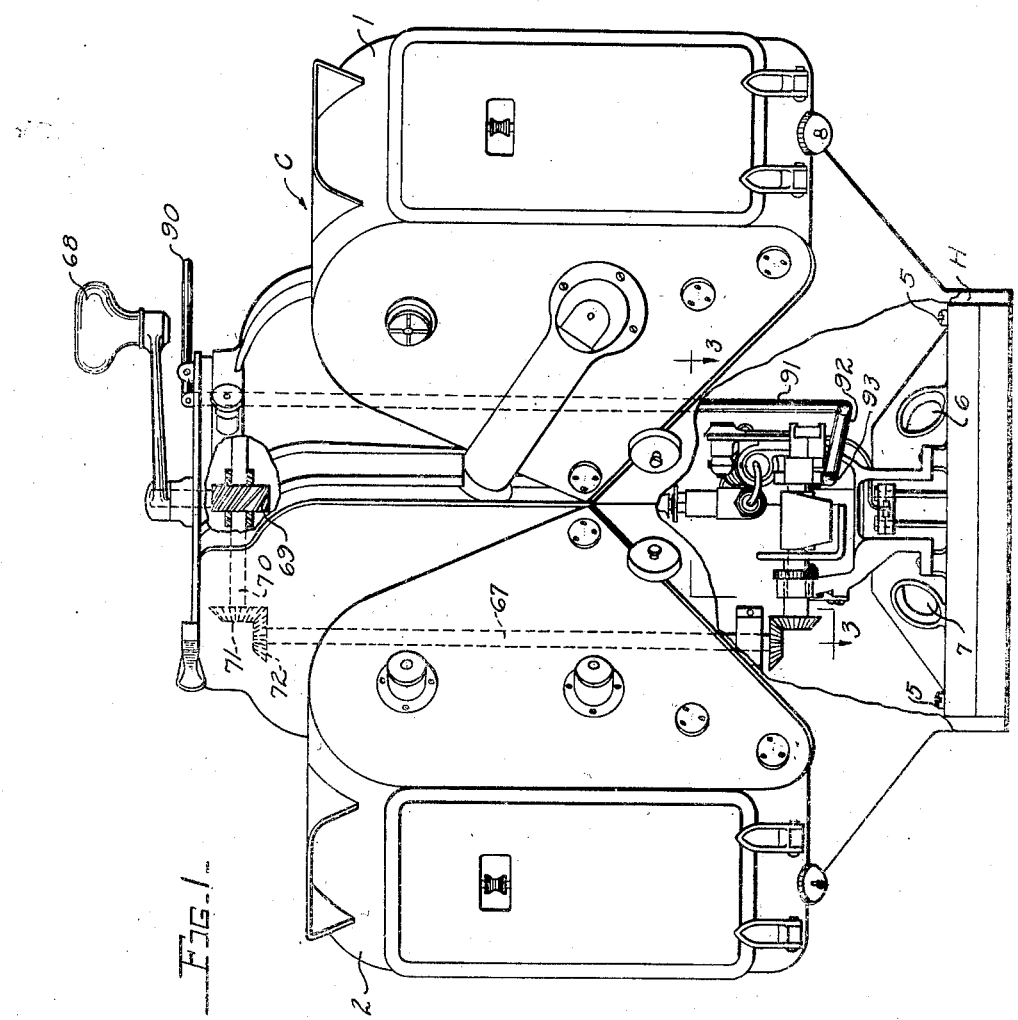

Referring to the drawings, and particularly to Fig. 1, C refers generally to a multilens camera which, in the preferred embodiment, is a five-lens camera. Operatively associated with each lens is a box member containing film-holding and winding mechanism. Only two such box members, numbered 1 and 2, are shown in Fig. 1, but it is to be understood that a box member is provided for each lens.

Figure 3:
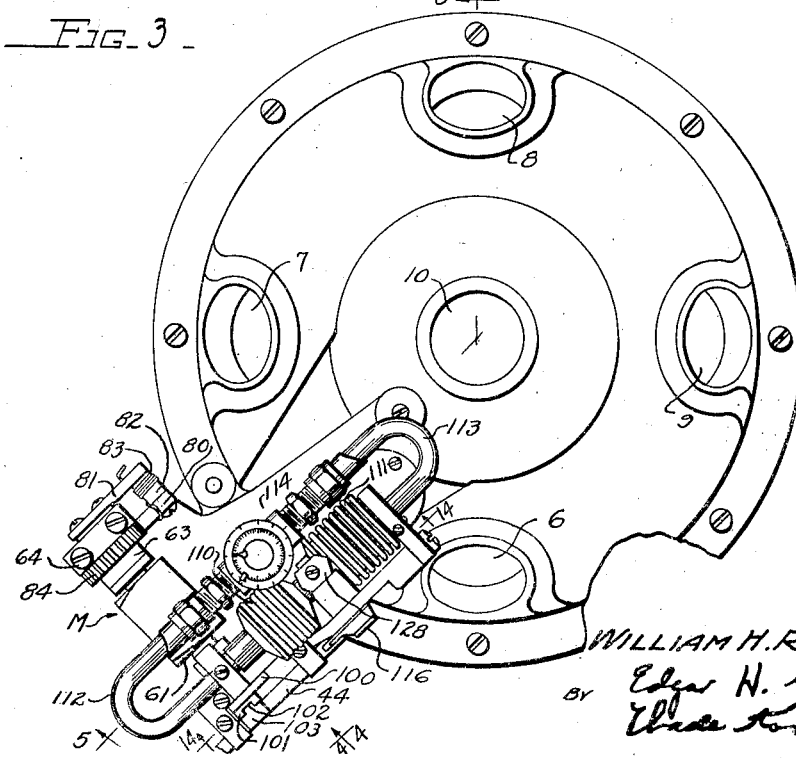
Fig. 3 is a detailed plan view of the shutter-operating mechanism and the shutter and lens housing taken generally along the lines 3—3 of Fig. 1.

Referring to Figs. 1 and 5, a shutter and lens housing, referred to generally as H, is suitably fastened to the camera proper. The housing comprises an upper member 3 and a lower member 4, spaced apart and suitably fastened together by screws, all of which have been numbered 5. As shown in Fig. 3, the housing has suitable lens-receiving openings 6, 7, 8, 9, and 10. In lower member 4 the wall 11, defining opening 10, constitutes a bearing for the bearing portions 12 and 12a, respectively, of sheet-like members 13 and 14, which form the shutter for four of the five lenses.

Shutter members 13 and 14 are provided with a series of openings adapted to be moved into and out of alignment with lens-receiving openings 6, 7, 8, and 9 for simultaneous exposure of the film associated with each lens.

As shown in Fig. 6, members 3 and 13 are partially cut away adjacent lens opening 8, showing opening 15 in member 13 and opening 16 in member 14 adapted to be aligned with lens opening 8 for exposure purposes. Members 13 and 14 are provided with similar openings adjacent lens openings 6, 7, and 9.

Lens opening 10 is provided with a shutter mechanism comprising two leaf-like members 17 and 18 pivoted at 21. Opening 19 in member 17 and opening 20 in member 18 are adapted to be brought into alignment with lens opening 10, as shown in Fig. 7, for exposure of the film associated with lens opening 10. Shutter members 14 and 15, as well as shutter members 17 and 18, are simultaneously operated by a single shutter-operating mechanism which is adapted, upon the application of an equal force in each of two directions, to move the shutters through a complete opening and closing cycle of operation.

Figure 2:
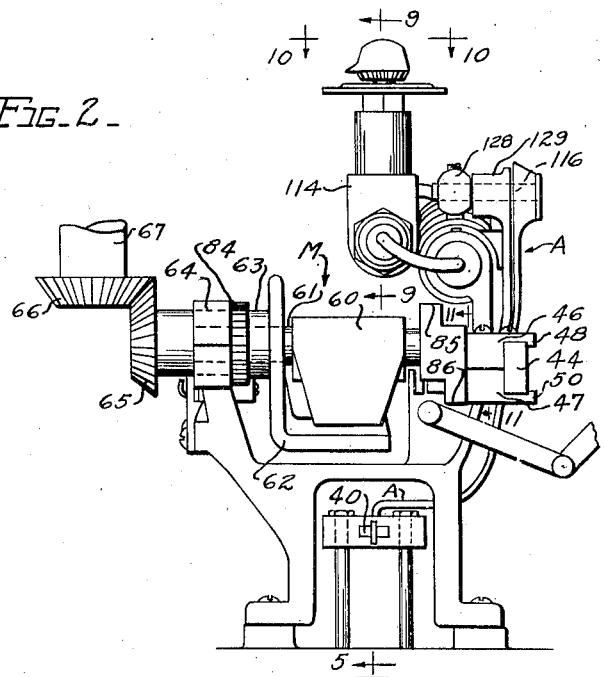
Fig. 2 is an enlarged elevational view of the shutter-operating mechanism shown in the cutaway portion of Fig. 1.

The shutter-operating mechanism comprises generally—as shown in Fig. 2—a spring motor M, a latch mechanism including trigger member 88 (Fig. 4) for controlling the operation of the motor, and arm A for transmitting the operating force from the motor to the crosshead member 22.

As shown in Figs. 6 and 13, upper shutter members 17 and 18 are operatively connected to crosshead member 22 by means of links 23 and 25— pivotally connected to member 22 by pin 27— and links 24 and 26—pivotally connected to links 23 and 25 by pins 28 and 29, pivotally received in openings 34 and 35 of links 24 and 26. The links 24 and 26 are pivotally connected by pins 32 and 33 to shutter blades 18 and 17, respectively. Shutter blades 13 and 14 are operatively connected to links 23 and 25 by means of links 36 and 37. Link 36 is pivotally connected at one end to pin 28 and at the other end to blade 14. Link 37 is pivotally connected at one end to pin 29 and to the other end to blade 13. Pins 28 and 29 are guided for reciprocatory movement in slots 30 and 31. Links 24 and 26 are slidably received in suitable recesses in member 34, recess 38 being shown slidably receiving link 24. A corresponding recess 39 is provided for link 26. Recesses 38a and 39a are provided in member 34a for slidably receiving links 36 and 37. Link members 23 and 25, crosshead member 22, and guiding slots 30 and 31 for pins 28 and 29 are so constructed and arranged that the link members 23 and 25 make the same angle with respect to each other when the crosshead member is in either its complete forward or rearward position.

Referring generally to Figs. 2 and 4, there is shown integral with crosshead member 22 an extension 40 having a slot 41 therein for receiving the lower end 42 of actuating arm A. Actuating arm A is mounted for pivotal movement at 43.

Pivotally connected to arm A at 45 is a member 44 guided for reciprocatory movement in guide members 46 and 47, suitably fastened together and having ears 48, 49, 50, and 51 for embracing and guiding member 44.

Member 44 is driven backwards and forwards by spring motor M which comprises spring 60 fastened at one end to shaft 61 and at the other end to member 62 having a hub portion 63 rotatably mounted on shaft 61 and in bearing 64. Gear 65, integral with hub 63, meshes with gear 66, integral with shaft 67, which in turn is rotated, as shown in Fig. 1, by the handle 68, gear 69, shaft 70, and the gears 71 and 72. Shaft 70 is also operatively geared to the film-winding mechanism (not shown since it is of more or less of a conventional type, reference being made to the patent to Briechle et al., No. 1,890,074, for a more specific disclosure) so that the spring motor is automatically tensioned upon each winding of the film. To hold the spring in tensioned position, there is shown in Fig. 3 a pawl 80 pivotally mounted on bracket 81 by pin 82 and urged by spring 83 into engagement with ratchet wheel 84, integral with hub 63. Rotation of shaft 61 is controlled by trigger member 88 (Figs. 2, 4, 11, and 12) cooperating with oppositely projecting sear members 85 and 86, which in turn are integral with shaft 61 and offset with respect to each other. Trigger member 88 is pivotally mounted for lateral movement in support 87 and is actuated by handle 90 (Fig. 1), rod 91—pivotally connected at opposite ends to handle 90—and rod 92, which in turn is fixed to shaft 93 (Figs. 1 and 11). Shaft 93 has a projecting portion 94 operatively received in a slotted portion 95 of trigger member 88, so that raising or lowering of the handle 90 results in rotation of shaft 93 and lateral movement of trigger member 88. With the parts in position as shown in Fig. 11, sear member 86 abuts against trigger member 88, preventing rotation of shaft 61. Trigger member 88 is movable laterally out of engagement with sear 86 and into the path of movement of sear 85. Shaft 61 is rotated through 180°, under action of spring 60, until sear 85 abuts trigger 88. Movement of the trigger in the opposite direction will uncover sear 85, permitting rotation of shaft 61 until sear 86 abuts trigger 88.

Integrally united with shaft 61—as shown in Figs. 3 and 14—is a disk-like member 100 having eccentrically and freely rotatably mounted thereon, by means of pin 59, a shoe member 101 having a recess 102 therein, into which a guide or projection 103 on member 44 fits. Rotation of shaft 61 rotates eccentrically mounted shoe 101 to reciprocate member 44. Sliding movement between shoe 101 and the guide 103 is of course necessary to convert rotary motion of shaft 61 into sliding motion of member 44.

Mechanism is provided—as shown in Figs. 2, 3, and 14—for controlling the shutter speed in a range of temperatures that will be encountered in aerial photography. Accordingly, there is provided an adjustable viscosity resistance valve 114, opposed Sylphons 110 and 111—interconnected only through said valve by tubes 112 and 113, and a lever 128 between said opposed Sylphons and fixed to shaft 116. Since arm A is also fixed to shaft 116—rotatably mounted in bearing 129 —lever 128 and arm A move simultaneously, forcing the viscous fluid from one Sylphon into another through said valve. The valve is adjustable and precalibrated for various shutter speeds at different temperatures.

Referring to Fig. 9, valve stem 115 is adjustable to regulate the resistance to flow of viscous fluid through the valve 114. Indicia means is provided to enable the operator to set the valve for desired shutter speeds at different temperatures. Head 127 has a pin and slot sliding connection 117 with valve stem 115. Spring 118 normally keeps head 127 in an up position. Valve stem 115 is rotated with head 127 in the up position to set the valve at a desired shutter speed indicated by pointer 126 and scale 119. Scale 119 is frictionally rotatably held in adjusted position by flange 120 on scale 121. By pressing down on head 127, the serrations 122 thereon engage with serrations 123 on scale 119, enabling rotation of scale 119 until the valve is adjusted with pointer 124 in a desired relation with temperature scale 125.

Referring to the modification of the invention shown in Figs. 15, 16, and 17, there is illustrated an operating mechanism for a camera having a single shutter. A spring motor $M^1$, comprising a spring 130 for operating the shutter-operating link mechanism, is tensioned by rotation of shaft 131, driven by a source of power (not shown). Integral with shaft 131 is a gear 132 which meshes with gear 133 integral with shaft 134. Shaft 131 is also provided with a ratchet wheel 135, with which spring-pressed pawl 136 cooperates for preventing rotation of shaft 131 in a direction which would result in unwinding of spring 130. Spring 130 is fastened at one end to shaft 134 and at the other end to bracket 137, freely rotatably mounted on shaft 134. Bracket 137 has attached thereto a double sear member 138 having oppositely projecting offset sears 139 and 140, which alternately abut trigger member 141. Rigidly attached to trigger member 141 is a trigger-operating shaft 142, guided for sliding movement in bearings 143 and 144 of frame member 145. As shown in Fig. 16, trigger member 141 is shown in engagement with sear member 140. Upon raising rod 142 the trigger is moved out of the path of and disengaged from sear 140, into the path of movement of sear 139, permitting rotation of sear member 138 through 180°. Rigidly attached to the sear member to rotate therewith is a collar member 150, freely rotatably mounted on shaft 134. Integral with collar member 150 is a disk member 151 having eccentrically attached thereto a cylindrical projecting pin 152, adapted to be received in a grooved portion 153 of a crosshead member 154. As shown in Fig. 17, crosshead member 154 is slidably received for reciprocatory movement in a guide groove 155 in member 156. Crosshead member 154 has pivotally attached thereto by means of pin 179 a pair of diverging link members 157 and 158. The outer ends of links 157 and 158 have pivotally attached thereto link members 159 and 160, which in turn are guided for sliding movement in recesses 161 and 162 in member 156. Member 156 is provided with lateral slots 163 and 164 for guiding the pins 165 and 166, which in turn serve to pivotally connect link 157 to link 159, and link 158 to link 160. The outer ends of links 159 and 160 are pivotally connected to shutter members 167 and 168 at 169 and 170.

The operation of this modification of the device is as follows: Assuming spring motor $M^1$ to be in a wound condition, trigger member 141 is raised, permitting member 138, disk 151, and cylindrical projecting member 152 to rotate through 180°. Member 152, by engagement with slot 153 of member 154, moves member 154 from the position shown in Fig. 17 to a corresponding position on the opposite side of slots 163 and 164. Pins 165 and 166 are guided for straight line movement in a direction at right angles to the movement of member 154. Shutter members 167 and 168 are caused to pivot about 170 to an open position when the pivotal connection 169 of links 157 and 158 is in line with the center line of slots 163 and 164. Continued movement of member 154 to its other extreme position draws the shutter members together in closed position. Upon again operating the trigger member, the crosshead member is moved from the left to the right in an opening and closing movement of the shutter members.

The compact, efficient shutter-operating mechanism enables to be built into the camera, mechanism adapted to automatically operate the shutter-operating mechanism upon energization by an external source of light—for instance, a flare.

Figure 19:
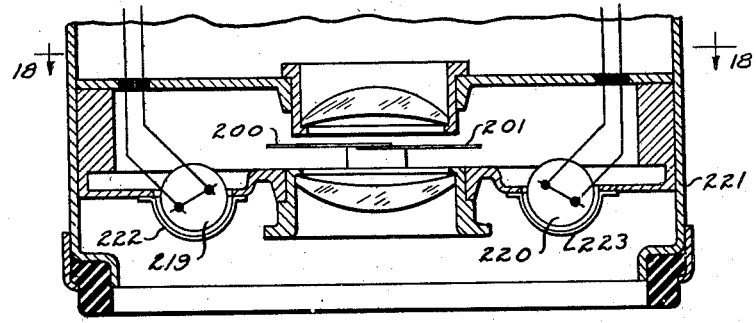
Fig. 19 is a cross-sectional view taken along the lines 19—19 of Fig. 18.
Figure 18:
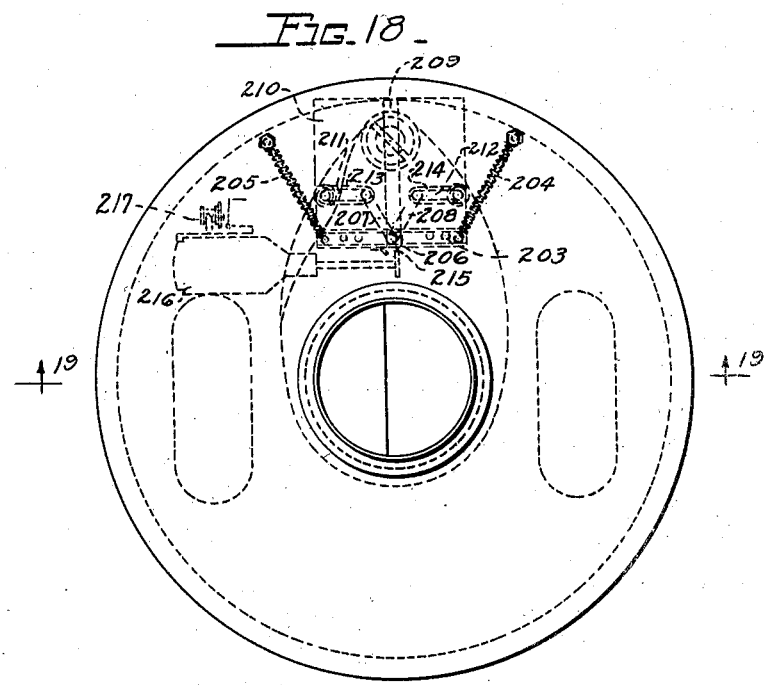
Fig. 18 is a cross-sectional view taken generally along the lines 18—18 of Fig. 19 of a camera-lens housing and shutter-operating mechanism adapted for operation upon energization of a photoelectric cell.

Referring to Figs. 18 and 19, a pair of shutter members 200 and 201 are actuated by crosshead member 203, which in turn is actuated by springs 204 and 205. Pivotally connected to crosshead member by a pin 206, are a pair of link members 207 and 208. A portion of pin 206 projects into slot 209 in guide member 210. Shutter members 200 and 201 are pivotally connected to links 207 and 208 by link members 211 and 212, which in turn are guided in recesses 213 and 214 in member 210, as in the modification in Fig. 17. The pins connecting link 208 with link 212, and link 207 with link 211 are received in slots for guiding movement, as in Fig. 17. Operatively associated with pin 206 is a pivotally-mounted latch 215, adapted to be actuated by solenoid 216, which in turn is energized by a relay 217, operatively connected to light-sensitive photo-electric cells 219 and 220. Camera housing 221 extends downwardly to provide a casing for the assembly. Photo-electric cells 219 and 220 are provided with covers 222 and 223, which may be removed when it is desired to operate the device. It will be necessary to re-cock the shutter-operating mechanism by hand-operated means (not shown) to tension springs 204 and 205 and bring pin 206 into latching engagement with latch 215. Naturally, the latch-operating mechanism will have to be re-cocked when it is dark, or the lens will have to be covered during the re-cocking operation, in order to avoid unwanted film exposure.

It is understood that the above disclosure is by way of example only, and it is intended that the scope of the invention be limited only by the appended claims.

I claim:

1. In a camera, shutter members and shutter-operating mechanism therefor, comprising a rotary driving element, a reciprocatory driven element, means operatively connecting said elements, releasable means for preventing rotation of said rotary element, means operatively associated with said driving element for controlling the speed of operation thereof, and means connecting said reciprocatory element with said shutter members for operating the same through a complete opening and closing cycle of operation upon movement of said reciprocatory member in each direction including a pair of links, each link of said pair being pivotally attached at one end to said reciprocatory element, means for guiding the other end of each link in a path normal to the path of movement of said reciprocatory member, and means for connecting one of said members to the said other end of one of said links and the other of said members to the said other end of the other of said links.

2. In a camera, shutter members and shutter-operating mechanism therefor, comprising a rotary driving element, a reciprocatory driven element, means operatively connecting said elements, releasable means for preventing rotation of said rotary element, means operatively associated with said driving element for controlling the speed of operation thereof, and linkages connecting said reciprocatory element with said shutter members for operating the same through a complete opening and closing cycle of operation upon movement of said reciprocatory member in each direction—each of said linkages comprising a pair of link members pivotally connected at their inner ends, the outer end of one of said link members being pivotally connected to said reciprocatory element, the outer end of the other of said link members being pivotally connected to one of said shutter members, and means for guiding the inner ends of said link members in a path of movement at right angles to the path of movement of the reciprocatory driving element.

3. In combination, pivotally-mounted shutter members; a cross-head member mounted for reciprocatory sliding movement; link members, each of which is pivotally connected at one end to said crosshead member; means for guiding the other end of each of said link members for movement in a path normal to and at the mid-point of the path of reciprocatory sliding motion of the said pivotal connection on said crosshead member; and means pivotally connecting the guided end of each of said first-named links with a shutter member whereby said shutter members execute a complete opening and closing cycle upon movement of said crosshead member in each direction.

4. In a multi-lens camera, a two-bladed shutter having shutter openings operatively associated with the several lenses of said camera and means for operating said shutter through a complete opening and closing operation, comprising a reciprocal member; a pair of links, each of which is pivotally connected at one end to said reciprocal member; guide means at the mid-point of movement of said reciprocal member and normal thereto for guiding the other ends of said links, said links diverging from the direction of movement of said reciprocal member at angles which are equal in either extreme position of said reciprocal member; and link means freely pivotally connecting each of said other ends of said links with one of the blades of said shutter.

5. Mechanism for producing relative reciprocal movement between members constituting a shutter, comprising a reciprocal driving element, a link pivotally connected at one end to said driving member, means for guiding the other end of said link normal to the direction of movement of said driving element, and a second link freely pivotally connecting one of said shutter members to said other end of said first link.

6. A device as recited in claim 5, in which the inward end of said guiding means is spaced from said driving element whereby said link diverges from the path of movement of said driving element.

7. Mechanism for operating pivotally-mounted blades constituting a shutter, comprising a base member, a crosshead member guided for reciprocal movement on said base member, and a pair of linkages, each of which is pivotally connected at one end to said crosshead member and eccentrically freely pivotally connected at the other end to one of said shutter blades, said base member having a pair of slots normal to and at the mid-point of the motion of said crosshead for slidably receiving said other ends of said pair of linkages, the inward ends of said slots being so located that the links are in an outwardly divergent position when the crosshead is in either of its extreme positions.

8. In combination, a reciprocatory driven member and means for controlling the operative speed of said member comprising opposed Sylphons, means connected to said reciprocatory member and positioned between said Sylphons for alternately compressing the same, an adjustable viscosity resistance valve, means connecting said Sylphons through said valve for the flow of viscous fluid from one Sylphon through said valve to the other Sylphon upon compression of a Sylphon by said connecting means.

9. A device as recited in claim 8, in which said valve is precalibrated for different shutter speeds at different temperatures and indicia means associated with said valve whereby said selected speeds may be obtained at given temperature.

10. In a camera, shutter members; shutter-operating mechanism comprising a rotary driving element; a reciprocatory driven element; means operatively connecting said elements; releasable means for limiting rotative movement of said rotary element; means operatively associated with said driving element for controlling the speed of operation thereof, comprising opposed Sylphons, means operatively connected to said driven element and positioned between said Sylphons for alternately compressing the same, an adjustable viscosity resistance valve, means connecting said Sylphons through said valve for the flow of viscous fluid from one Sylphon through said valve to the other Sylphon; and means connecting said reciprocatory element with said shutter members for operating the same through a complete opening and closing cycle of operation upon movement of said reciprocatory member in each direction.

11. In a multilens camera having a single centrally disposed lens and a plurality of lenses radially disposed with respect to said single lens, a pair of members mounted to pivot about the axis of said centrally disposed lens and having a series of radially disposed openings corresponding to said radially disposed lenses to constitute a multilens shutter means therefor, a pair of members mounted to pivot about an axis offset with respect to said centrally disposed lens to constitute a shutter means therefor, and means operatively connected to both of said shutter means for simultaneously operating the same.

12. A device as recited in claim 11, in which said operating means comprises a driving element reciprocal on a line passing through said two axes of pivoting, a pair of divergingly arranged links pivotally connected at one end to said driving element, means for guiding the other ends of said links normal to said line, and means connecting one member of each pair of members to said other end of one of said links and the other member of each pair to said other end of the other of said links.

13. In a multilens camera, a pair of pivotally mounted plate-like members constituting a multilens shutter—said plate-like members each having a series of openings disposed to correspond with said lenses, and means for moving said members to bring said openings into and out of alignment with their corresponding lenses, including a crosshead member mounted to reciprocate radially with respect to the point of pivoting of said members, a pair of divergingly arranged links pivotally connected at one end to said crosshead member, means for guiding the other end of said links normal to the path of movement of said crosshead member, and means for connecting each one of said members to the said other end of one of said links.

14. A device as recited in claim 13, in which said last-named means comprises a link pivotally connected at one end to one of said members, and at the other end to the said other end of one of said links.

15. In a camera, shutter mechanism, means for operating said shutter mechanism and means for selectively controlling the operative speed of said shutter means, including opposed Sylphons, an adjustable viscosity valve, means operatively connecting said viscosity valve and said Sylphons, and means operatively associated with said shutter-operating means and said Sylphons for driving the viscous fluid from one Sylphon through said valve into said other Sylphon.

16. In a camera having a lens, a pair of members mounted to pivot about a given axis and constituting shutter means for said lens, reciprocatory means for moving said members through a complete opening and closing cycle of operation upon movement of said reciprocatory member in each direction, including a pair of links, each link of said pair being pivotally attached at one end to said reciprocatory member, means for guiding the other end of each link in a path normal to the path of movement of said reciprocatory member, and means for connecting one of said members to the said other end of one of said links and the other of said members to the said other end of the other of said links.

17. In a camera, shutter members and shutter-operating mechanism therefor comprising a rotary driving element, a reciprocatory driven element, means operatively connecting said elements, and means for releasing said rotary element for movement and for stopping such movement including circumferentially spaced, radially projecting, laterally offset sear members on said rotary element and a laterally movable trigger member successively engageable with said sear members, whereby engagement of said trigger member with one of said sear members functions to prevent rotative movement of said driving element, and said trigger member, when moved laterally, becomes disengaged from said one of said sear members and is moved into position to be engaged by and serve as a stop for another of said sear members.

18. In a camera, shutter mechanism, motor means for operating said shutter mechanism and means for starting and stopping said motor means including a member operatively associated with said motor means and having thereon longitudinally spaced, laterally offset, stop members, and a member laterally movable for successive engagement with said stop members whereby engagement of said member with one of said stop members serves to stop said motor means and movement of said member laterally serves to release said motor for operating said shutter means until said member becomes engaged with another of said stop members.

19. In a camera, shutter means reciprocal means operatively connected to said shutter means for moving the same through a complete opening and closing cycle upon movement in each of two directions, rotary means eccentrically connected to said reciprocal means for driving the same, said rotary means being provided with circumferentially spaced, laterally offset sear members to rotate therewith, a trigger member adapted to successively engage said sear members and laterally movable from engagement with one of said sear members into the path of movement of the other of said sear members whereby said driving member is moving through a complete opening and closing cycle of operation of said shutter means whereupon another of said sear members contacts said trigger member.

WILLIAM H. RICHARDS.